United States Patent Office 2,935,524
Patented May 3, 1960

2,935,524

β-METHYLENEAMINOPROPIONITRILE AND ITS CONVERSION TO β-ALANINE

Lawrence H. Knox, Katonah, N.Y., and George A. Bernotsky, Linden, N.J., assignors to Nopco Chemical Company, Harrison, N.J., a corporation of New Jersey No Drawing. Application December 20, 1957
Serial No. 704,007

18 Claims. (Cl. 260—465.5)

The present invention relates to the preparation of β-alanine (β-aminopropionic acid). More particularly, this invention relates to the preparation of a new compound, β-methyleneaminopropionitrile, and its conversion to β-alanine.

β-Alanine is an important intermediate for use in the preparation of pantothenic acid. Various procedures have been devised for obtaining this intermediate. The most common manner for obtaining β-alanine involves the reaction of acrylonitrile and ammonia or ammonium hydroxide at elevated temperatures and in some procedures, under superatmospheric pressures. Such procedures involve techniques requiring closed vessels, high pressure systems, etc.

Accordingly, it is an object of the present invention to provide a process of obtaining β-alanine in high yields without the necessity of employing high temperatures or elevated pressures.

A further object is to prepare a novel intermediate which may be converted to β-alanine thereby providing a new process for obtaining β-alanine.

Other objects of the invention will be obvious and will, in part, appear hereinafter.

The above and other objects have been unexpectedly accomplished in the following manner. By the reaction of aqueous formaldehyde, aqueous ammonia and acrylonitrile at low temperatures a novel compound, namely, β-methyleneaminopropionitrile is obtained. This compound in turn may be converted to a salt of β-aminopropionitrile which in turn may be hydrolyzed to β-alanine.

More specifically aqueous formaldehyde having a concentration of 18% to 40% by weight is added to aqueous ammonia generally having a concentration of 14% to 28% by weight in an approximately 1:1 mol ratio at low temperatures e.g., from —10° C. to 20° C. Thereafter acrylonitrile is added to the mixture of the preceding materials at —10° C. to 20° C. and preferably in an equimolar amount. However, the formaldehyde, ammonia, and acrylonitrile may be present in a mol ratio of from about 1:1:1 to 2:2:1. Preferably the formaldehyde and ammonia are present in approximately aquimolar quantities. The order of addition may be changed e.g., the ammonia solution may be added to a mixture of the acrylonitrile and formaldehyde. The resulting mixture is stirred while the temperature is allowed to rise slowly to a temperature from about room temperature to about 75° C. This usually occurs in about one half to 4 hours and is accomplished by controlling the coolant surrounding the reaction mixture. The material is then distilled under reduced pressure to remove water and other volatile materials. The semicrystalline residue contains 70% to 80% by weight of β-methyleneaminopropionitrile. This compound can be isolated by crystallization from low molecular weight monohydroxy alcohols, e.g., methanol, ethanol, a proprietary alcohol as Synasol, isopropanol, n-butanol or isobutanol. It is a colorless crystalline compound having a melting point of 69° C. It is extremely unstable in acid and in this manner it may be converted quantitatively to the corresponding salt of β-aminopropionitrile with the loss of formaldehyde. The following equations demonstrate the preparation of β-methyleneaminopropionitrile and its conversion to a salt of β-aminopropionitrile with loss of formaldehyde.

$$NH_3 + HCHO + CH_2=CHCN \rightarrow CH_2=NCH_2CH_2CN + H_2O$$

$$CH_2=NCH_2CH_2CN + HA + H_2O \rightarrow H_2NCH_2CH_2CN \cdot HA + HCHO$$

where HA represents acid. The salts of β-aminopropionitrile may be obtained in high yield from alcoholic solvents and may be readily hydrolyzed to β-alanine. Alternatively β-methyleneaminopropionitrile itself may be directly hydrolyzed in acid to form β-alanine hydrochloride and then treated with a base to obtain β-alanine.

The following examples are directed to preferred embodiments of our invention and are not to be construed in a limiting sense.

The first six examples are directed to the preparation of β-methyleneaminopropionitrile.

EXAMPLE I

*Preparation of β-methyleneaminopropionitrile*

A mixture of 90.6 grams of 36.4% by weight of aqueous formaldehyde and 85 cc. of water was added to a mixture of 75 cc. of 28% by weight of aqueous ammonia and 75 cc. of water at —8° C. during the course of 30 minutes. Thereafter 53.0 grams of acrylonitrile were added and the system was allowed to come slowly to room temperature. Water and volatile impurities were then removed by distillation under reduced pressure. The semicrystalline residue remaining after distillation was triturated with 50 cc. of Synasol (100 parts denatured ethanol, 5 parts ethyl acetate, and 1 part aviation gasoline) and allowed to stand for several hours at 3° to 5° C. The colorless, crystalline product, β-methyleneaminopropionitrile, was filtered, washed with cold Synasol, and dried over calcium chloride in vacuo. The yield was 50.0 grams (71.0% of theory) and the melting point was 67° to 68° C. Recrystallization from Synasol raised the melting point to 69° C.

Calculated for $C_4H_6N_2$: C, 58.53; H, 7.31; N, 35.17. Found: C, 58.74; H, 7.30; N, 34.07.

EXAMPLE II 1.4 mols of a 17.5% by weight aqueous formaldehyde solution was added dropwise with stirring to 1.4 mols of a 14% by weight aqueous ammonia solution at 0° to 5° C. during the course of 10 to 20 minutes. Thereafter 1.0 mol of acrylonitrile was introduced at the same temperature. During the course of 4 hours, the system was allowed to slowly rise to room temperature without removing the cooling bath. The reaction mixture was then evaporated on a steam bath under reduced pressure and the semicrystalline residue was taken up in 50 cc. of isopropanol and set aside at 3° to 5° C. for 12 to 15 hours. The colorless crystalline product was filtered, washed with a little solvent and finally with a little ether to facilitate rapid drying of the product in vacuo at room temperature. From the filtrate, a second crop was obtained. The first crop yielded 81.0 grams of β-methyleneaminopropionitrile (softening point, 58° C.; M.P., 64° C.) and the second crop yielded an oil. The percent yield was 98.7%.

EXAMPLE III

In this example the aqueous formaldehyde solution was prepared from paraformaldehyde as follows. 34.8 grams (1.1 mol) of 95% paraformaldehyde were heated for two hours and twenty minutes on a steam bath under reflux with 150 cc. of water. The material was then cooled, filtered and the filtrate washed with 25 cc. of water. The cooled filtrate and washings were added to 150 cc. of a 14% by weight aqueous ammonia solution at 0° to 5° C. during the course of 20 minutes. Thereafter 1.0 mol of acrylonitrile was introduced at the same temperature and the system was allowed to slowly rise to room temperature overnight. β-methyleneaminopropionitrile was isolated with isopropanol. 58.2 grams were recovered having a melting point of 65° to 66° C. The yield was 71.1%.

EXAMPLE IV 1.2 mols of an 18% weight aqueous formaldehyde solution was added dropwise with stirring to 1.2 mols of a 14% by weight aqueous ammonia solution at 0° to 5° C. during the course of 10 to 20 minutes. Thereafter 1.0 mol of acrylonitrile was introduced all at once at 0° C. During the course of 4 hours, the system was allowed to slowly rise to room temperature. Agitation was employed during reaction. The reaction mixture was then evaporated on a steam bath under reduced pressure to distill off water and unreacted reagents and the residue was taken up in 50 cc. of isopropanol and set aside at 3° to 5° C. overnight. The colorless crystalline product was filtered and washed first with 25 cc. isopropanol and then with 50 cc. of ether. It was dried in a desiccator and in a vacuum oven until a constant weight was reached. From the filtrate, a second crop was obtained. The first crop yielded 72.0 grams (M.P. 61° to 67° C.) and the second crop yielded 0.55 gram of material melting above 135° C. The yield was 87.8%.

EXAMPLE V 125 grams (1.5 mols) of 35.9% by weight aqueous formaldehyde solution was added dropwise with agitation to 102 cc. (1.5 mols) of 28% by weight aqueous ammonia solution during the course of 20 minutes. The temperature during addition was maintained between —10° to —15° C. Thereafter 53.0 grams (1 mol) of acrylonitrile were all at once at —12° C. The cooling bath was removed and the temperature rose to 30° C. in 45 minutes. The system was then cooled to 28° C. and no further temperature rise was then observed. This material was then distilled in vacuo and the residue was triturated with 50 cc. of Synasol and allowed to stand for several hours at 3° to 5° C. The resulting crystalline mass was then filtered, washed with cold Synasol and dried at room temperature in vacuo. 41.0 grams of β-methyleneaminopropionitrile were obtained having a melting point at 65.6° C.

EXAMPLE VI 75 cc. (1.1 mols) of a 28% by weight aqueous ammonia solution was added to a suspension of 34.76 grams (1.1 mols) of 95% paraformaldehyde contained in 75 cc. of water. Addition took place at a temperature of 5° to 10° C. during 20 minutes. Subsequently 53.0 grams (1 mol) of acrylonitrile were added and the temperature maintained at 5° to 10° C. for one hour and thirty minutes. Half of the acrylonitrile separated out. The cooling bath was then removed and the temperature was allowed to rise to 28° C. during 25 minutes. No more acrylonitrile was then observed, indicating its complete reaction. The system was allowed to stand overnight at 3° to 5° C. A yield of 42.0 grams of β-methyleneaminopropionitrile was obtained having a melting point range of 67° to 68° C. This amounted to 51.2% of the theoretical yield.

The following two examples illustrate the preparation of derivatives (salts) of β-methyleneaminopropionitrile. These salts are obtained by reaction of β-methyleneaminopropionitrile with the desired acid at room temperature or below, e.g., 0° to 5° C.

EXAMPLE VII

To 75 cc. (1.1 mols) of 28% by weight aqueous ammonia, 99.0 grams (1.1 mols) of 34% by weight aqueous formaldehyde were added at 0° C. 53.0 grams (1 mol) of acrylonitrile were added all at once and the temperature maintained at 0° to 5° C. for 2 hours. The temperature was then allowed to rise to 15° C. and held at this temperature for 1½ hours. The material was stored overnight at 3° to 5° C. 56 grams of a heavy, colorless oil separated and were recovered. A mixture of 25.0 grams of this oil and 75.0 cc. of water was distilled. From the distillate, which comprised 50 cc. of material, 2.5 cc. of acrylonitrile separated. Upon cooling of the residue, unchanged oil separated.

A solution comprising 5.0 grams of this oil and 10 cc. of dry Synasol was neutralized at room temperature with a 50% by weight Synasol-hydrogen bromide solution. A little ether was added. Colorless crystals of the hydrogen bromide derivative separated which were filtered, washed with cold Synasol, followed by ether and dried for 1 hour at 65° C. It melted at 168° to 170° C. Titration with standard alkali using phenolphthalein gave an apparent molecular weight of 162.8. The molecular weight calculated for $CH_2{=}NCH_2CH_2CN \cdot HBr$ is 163.0. On drying overnight at 65° C. the salt acquired a pronounced orange color which could not be removed by repeated recrystallizations.

EXAMPLE VIII

In a manner similar to the preceding example, 5.0 grams of oil which were previously dried over calcium chloride in vacuo were converted to the hydrochloride salt in dry Synasol with a Synasol-hydrogen chloride solution. It melted at 152° to 156° C. and like the hydrogen bromide salt, it is not heat stable. It becomes pasty with loss of formaldehyde when dried at 65° C. Upon recrystallization from Synasol, pale yellow to orange tinted crystals are obtained if the mixture is heated for more than a few minutes to effect solution.

The following four examples are directed to the conversion of β-methyleneaminopropionitrile to β-alanine hydrochloride. In general, from about 4.5 to 5.0 mols of hydrochloric acid (usually concentrated) per mol of β-methyleneaminopropionitrile are refluxed from about 1 to 18 hours. The resulting β-alanine hydrochloride is thereafter neutralized in order to recover β-alanine. This may be accomplished by conventional means, e.g., sodium hydroxide, potassium hydroxide, amines, e.g., tri-butyl amine, etc.

EXAMPLE IX

To 75 cc. (1.1 mols) of 28% aqueous ammonia solution were added 92.0 grams (1.1 mols) 35.9% aqueous formaldehyde in a dropwise manner with stirring at about —20° C. Thereafter 53.0 grams (1 mol) of acrylonitrile were added all at once. The temperature was permitted to rise to 15° C. and was maintained at 15° to 25° C. for two hours. After standing overnight, the mixture was steam distilled under reduced pressure and finally in vacuo at about 40° to 50° C. A cloudy, viscous residue weighed 84.0 grams and completely solidified to a waxy solid on short cooling at 3° to 5° C. The colorless crystalline product was dried at room temperature in vacuo and weighed 48.2 grams which amounted to 58.5% of theory (calculated as $C_4H_6N_2$).

This product was boiled gently for 2.25 hours and with 350 cc. of concentrated hydrochloric acid and allowed to stand overnight. The practically colorless β-alanine hydrochloride weighed 36.22 grams (49.2% of theory) and melted at 115° to 117° C.

EXAMPLE X

The procedure of Example IX was repeated. Thirty minutes were required for the addition of the formaldehyde to the ammonia. After adding the acrylonitrile the temperature was allowed to rise to 5° C. and held at 0° to 5° C. for 3 hours. The cooling bath was removed and the temperature allowed to come to that of the room. The reaction mixture cleared at 17° C. After standing overnight, the entire mixture was treated with 350 cc. concentrated HCl below 25° C., refluxed 30 minutes and finally boiled without condenser for 1 to 5 hours. The β-alanine hydrochloride obtained weighed 63.5 grams (50.6% of theory), M.P. 116° to 118° C.

EXAMPLE XI

Formaldehyde, ammonia, and acrylonitrile were reacted as indicated in the preceding example in order to obtain β-methyleneaminopropionitrile. The reaction mixture was then hydrolyzed with 700 cc. of concentrated hydrochloric acid by heating the mixture rapidly to 95° C. over a Bunsen flame and then immediately transferring it to a steam bath for 2 hours. Thereafter, the water and excess hydrochloric acid were removed by vacuum distillation. To the sticky residue, 750 cc. of isopropanol were added and the system refluxed with agitation for one hour. The ammonium chloride was filtered off and the filtrate concentrated to 500 cc. and worked up. The yield of β-alanine hydrochloride was 64.7 grams (51.6% of theory). The melting point was 113° to 115° C. for 47.0 grams of product and 112° to 117° C. for 17.7 grams recovered from the mother liquor.

EXAMPLE XII 48.2 grams of β-methyleneaminopropionitrile were boiled gently with 350 cc. of concentrated hydrochloric acid for 2 to 3 hours and evaporated to dryness on the steam bath under reduced pressure. The residue was digested with 250 cc. of isopropanol on the steam bath, filtered and washed with isopropanol. The filtrate and washings while warm were treated with ether to just short of permanent turbidity. After standing overnight at 3° to 5° C., 36.22 grams (49.2% of theory) of β-alanine hydrochloride was obtained. After recrystallization from isopropanol, the colorless product melted at 122° to 123° C.

12.55 grams of β-alanine hydrochloride were dissolved in 50 cc. of methanol and treated with 20.0 grams of tri-n-butylamine. There was obtained 8.4 grams (94.4% of theory) of β-alanine having a melting point at 203° C.

The following five examples are directed to preparation of β-aminopropionitrile sulfate and hydrochloride.

EXAMPLE XIII 20.5 grams of β-methyleneaminopropionitrile were dissolved in 100 cc. of warm Synasol and treated with 19.2 cc. of 13.0 N sulfuric acid. After standing for several hours at 3° to 5° C., there were deposited 27.75 grams (93.3% of theory) of β-aminopropionitrile neutral sulfate as colorless crystals. The melting point was 225° to 228° C. with decomposition.

EXAMPLE XIV

β-Methyleneaminopropionitrile was prepared from acrylonitrile, aqueous ammonia and aqueous formaldehyde in a manner similar to the preceding examples. The residue remaining after removal of the volatile material on a steam bath under reduced pressure was taken up in a 150 cc. solution of 3 parts by volume of methanol and 7 parts by volume of isopropanol. This material was then treated with 50 cc. of 14 N sulfuric acid accompanied by cooling and agitation. After standing for 4 hours at 3° to 5° C. the product which was a colorless gelatinous sulfate was filtered, washed with a little cold methanol and sucked as free of solvent as possible. The damp cake weighing 107 grams was taken up in 25 cc. of hot water and treated on a steam bath with 75 cc. of methanol and 50 cc. of isopropanol in 10 cc. portions, the last portion producing permanent turbidity. The sulfate separated as an oil, was crystallized on cooling with vigorous agitation. After standing overnight at 3° to 5° C., the nicely crystalline product was filtered, washed with a little cold methanol and dried overnight at 65° C. The completely colorless product weighed 62.62 grams which was 52.7% of theory.

EXAMPLE XV

A crude product containing β-methyleneaminopropionitrile obtained from the reaction of acrylonitrile, aqueous formaldehyde and aqueous ammonia was taken up in a 300 cc. solution comprising 3 parts by volume of methanol and 7 parts by volume of isopropanol, and thereafter treated with 56.9 cc. of 50% sulfuric acid. The reaction mixture was set aside overnight at a temperature of 3° to 5° C. The product was filtered, washed, and dried for 72 hours at 65° C. The colorless sulfate which was not entirely free of formaldehyde weighed 78.0 grams (65.5% of theory).

EXAMPLE XVI 20.5 grams of β-methyleneaminopropionitrile were dissolved in a warm 50 cc. isopropanol, 25 cc. methanol solution. This solution was immersed in an ice water bath and treated with 18.8 cc. of 13.3 N sulfuric acid. After standing overnight at 3° to 5° C., the colorless sulfate was filtered, washed with a little isopropanol and dried overnight at 65° C. The colorless crystalline product weighed 28.83 grams (97.1% of theory).

In place of the preceding solvent mixture, other solvent mixtures may be employed such as methanol-isopropanol solvent mixture containing equal parts by volume of each alcohol, methanol, isopropanol, and Synasol. The quantity of sulfuric acid may vary from about 0.5 to 0.7 mol per mol of β-methyleneaminopropionitrile, although 0.5 mol are preferred. Reaction is generally carried out at 0° to 10° C. for about 3 to 12 hours.

EXAMPLE XVII

*Preparation of β-aminopropionitrile hydrochloride*

β-Methyleneaminopropionitrile was dissolved in warm Synasol (75° C.) and neutralized with a solution of dry hydrogen chloride in Synasol. Upon cooling colorless crystals of β-aminopropionitrile hydrochloride were deposited. The melting pint was 165° C. after recrystallization from Synasol.

Calculated for $C_3H_7N_2Cl$: C, 33.80; H, 6.63; N, 26.29; Cl, 33.29. Found: C, 33.92; H, 6.64; N, 26.39; Cl, 33.37.

Temperatures at least 50° C., e.g., 50° to 75° C. must be used since, as shown in Example VIII, when lower temperatures are used, the salts of β-methyleneaminopropionitrile are obtained.

The following five examples are directed to the alkaline hydrolysis of β-aminopropionitrile sulfate to β-alanine. In this process barium hydroxide is reacted with the sulfate at temperatures of from about 90° to 100° C., preferably at reflux for from 2 to 18 hours. The amount of barium hydroxide is from about 1.5 to 1.75 mols per mol of sulfate. Preferably the barium hydroxide is used as the octahydrate and when this form is used, the same mol ratios will apply. The amount of water present for hydrolysis is from 0.7 to 1.0 liter per mol of sulfate. After hydrolysis, β-alanine is recovered by neutralizing the reaction product, e.g., with sulfuric acid.

EXAMPLE XVIII 23.8 grams of the β-aminopropionitrile sulfate of Example XIII were boiled gently for 18 hours with 70.0 grams of barium hydroxide octahydrate in 100 cc. of water. The hydrolysis mixture was diluted with one liter of water, exactly neutralized with sulfuric acid, and filtered. The filtrate was concentrated to a syrup and poured into cold methanol to precipitate the β-alanine.

EXAMPLE XIX

Crude β-methyleneaminopropionitrile was converted to β-aminopropionitrile sulfate by treatment with 57 cc. of an 80% 14 N sulfuric acid in a solvent comprising 300 cc. of methanol and isopropanol (3:7 parts by volume). After standing overnight at 3° to 5° C., the nicely crystalline product was filtered and washed with a little cold methanol. The damp cake weighing 120 grams was hydrolyzed by heating for 4 hours in a 40% aqueous solution of barium hydroxide octahydrate which was prepared by dissolving 285 grams of the hydrate in 430 cc. of water. The reaction mixture was diluted with 1500 cc. of water, adjusted and worked up to obtain β-alanine. There was no development of color and the first and second crops of product were completely colorless. The first crop yielded 45.82 grams of β-alanine having a melting point of 198° C. accompanied by decomposition. The second crop yielded 2.80 grams of product having a melting point of 196° to 197° C. The yield represented 54.6% of theory or 91.7% by weight based upon the acrylonitrile employed in preparing the β-methyleneaminopropionitrile.

EXAMPLE XX 49.2 grams (0.206 mol) of recrystallized β-aminopropionitrile sulfate were hydrolyzed for 4 hours in 15% by weight excess of a 40% by weight aqueous hydrated barium hydroxide solution at 95° to 100° C. The reaction mixture was diluted with 1500 cc. of hot water and exactly neutralized with sulfuric acid. The filtered mixture was colorless and no odor of formaldehyde could be detected. Colorless β-alanine was obtained, the first crop weighing 29.78 grams (M.P. 200° to 202° C. with decomposition) and the second crop weighing 3.17 grams (M.P. 198° C. with decomposition). The yield was 89.7%.

EXAMPLE XXI

To 99.0 grams (1.1 mols) of 34% aqueous formaldehyde, 75 cc. (1.1 mols) of 28% aqueous ammonia were added at 0° C. 53.0 grams (1 mol) of acrylonitrile were then added all at once, the cooling bath removed, and the temperature allowed to rise unchecked. At 45° C. the solution cleared indicating complete solution of the acrylonitrile. The temperature continued to rise and levelled off at 66° C. When the mixture had cooled to room temperature a heavy oily layer separated (56.0 grams). The upper aqueous layer was saturated with anhydrous potassium carbonate and an additional 46.0 grams of oil separated as the upper phase. Crystals soon appeared in this latter fraction.

The original oily layer weighing 56.0 grams was boiled gently with successive portions of aqueous sulfuric acid (20 cc. 10% solution, 5 cc. 20% solution, 25 cc. 20% solution) at 10 minute intervals. Following each addition, formaldehyde was copiously evolved. The mixture was finally brought to pH 3 with 30 to 35 cc. of 50% $H_2SO_4$ and gently boiled for three hours. The mixture was then added dropwise during 20 minutes with vigorous stirring to 320 grams (1.02 mols) of fused barium hydroxide octahydrate at 95° C. on the steam bath. After 3 hours the mixture was diluted with one liter of hot water, exactly neutralized with sulfuric acid, and worked up. An oil was obtained which deposited from methanol on long standing at 3° to 5° C., 8.23 grams of β-alanine, M.P. 183° to 185° C.

EXAMPLE XXII

To 112.0 cc. (1.6 mols) of 28% aqueous ammonia, 148.0 grams (1.6 mols) of 34% aqueous formaldehyde were added at 0° to 5° C. 53.0 grams (1 mol) of acrylonitrile were added all at once and the temperature allowed to rise with no further cooling. The temperature rose to 60° C. When the temperature of the mixture had fallen to 32° C. (no oil separated), it was added dropwise with stirring during 20 minutes to 380 grams of barium hydroxide octahydrate on a steam bath at 95° C. Heating was continued for 15 minutes and the mixture allowed to stand overnight. Ammonia was copiously evolved. After heating the mixture an additional hour to completely expel ammonia, it was diluted with one liter of hot water, adjusted with sulfuric acid, filtered to remove barium sulfate, evaporated, and the residual syrup poured into cold methanol. The solution was seeded, scratched, and allowed to stand over the week-end at 3° to 5° C. The first crop amounted to 21.3 grams of β-alanine (M.P. 180° to 183° C.) while the second crop was 17.3 grams (M.P. 165° to 170° C.). Recrystallization of the first crop gave 9.07 grams of β-alanine, M.P. 200° to 201° C.

The preferred process for obtaining β-alanine from acrylonitrile, ammonia, and formaldehyde, is indicated by the following example.

EXAMPLE XXIII 53.0 grams of acrylonitrile were allowed to react with a mixture of 1.1 mols of 18% aqueous formaldehyde and 1.1 mols of 14% aqueous ammonia as described under Example I. The semi-crystalline residue obtained after distillation of water and other volatile material was taken up in 300 cc. of a methanol-isopropanol mixture (3:7 parts by volume) and treated with 57.0 cc. of 14 N sulfuric acid. After standing overnight, the nicely crystalline crude sulfate was filtered, washed with a little cold methanol, and sucked as free of solvent as possible. The damp cake was then hydrolyzed by boiling for 4 hours with 285 grams of barium hydroxide octahydrate in 430 cc. of water. From the hydrolysis mixture, in the manner described under Example XVIII, 48.02 grams (54.6% of theory based on acrylonitrile) of β-alanine were obtained, having a melting point at 200° C.

Having thus described our invention what we claim as new and desire to secure by Letters Patent is:

1. A process for obtaining β-methyleneaminopropionitrile comprising the steps of admixing at a temperature of from —10° C. to 20° C. in aqueous solution formaldehyde, ammonia and acrylonitrile in a mol ratio of from 1:1:1 to 2:2:1, allowing the temperature of the resulting mixture to slowly rise to a temperature of from about room temperature to 75° C. and recovering the resulting β-methyleneaminopropionitrile.

2. A process for obtaining β-methyleneaminopropionitrile comprising the steps of admixing a 18% to 40% by weight aqueous formaldehyde solution, a 14% to 28% by weight ammonia solution and acrylonitrile at —10° C. to 20° C. said formaldehyde, ammonia and acrylonitrile being in a mol ratio of about 1:1:1 to 2:2:1, allowing the temperature of the resulting mixture to slowly rise to a temperature of about room temperature to 75° C. and thereafter recovering the resulting β-methyleneaminopropionitrile.

3. The process of claim 2 in which said mol ratio of formaldehyde, ammonia and acrylonitrile is about 1:1:1.

4. A process for obtaining β-alanine hydrochloride comprising reacting β-methyleneaminopropionitrile with hydrochloric acid.

5. The process of claim 4 comprising refluxing β-methyleneaminopropionitrile with concentrated hydrochloric acid for about 1 to 18 hours.

6. The process of claim 5 in which from about 4.5 to 5.0 mols of hydrochloric acid are refluxed with one mol of β-methyleneaminopropionitrile.

7. The process of claim 6 in which said reflux temperature is about 95° C.

8. The process of claim 4 including the step of neutralizing the β-alanine hydrochloride and thereafter recovering the resulting β-alanine.

9. The process of claim 8 including the step of neutralizing said β-alanine hydrochloride with tri-n-butylamine.

10. A process for obtaining salts of β-aminopropionitrile comprising dissolving β-methyleneaminopropionitrile in an inert solvent and thereafter reacting it with a mineral acid.

11. A process for obtaining β-aminopropionitrile sulfate which comprises the steps of reacting β-methyleneaminopropionitrile with sulfuric acid in the presence of an inert solvent.

12. The process of claim 11 in which about 0.5 to 0.7 mol of sulfuric acid are reacted with one mole of β-methyleneaminopropionitrile at a temperature of 0° to 10° C. for about 3 to 12 hours.

13. A process for obtaining β-aminopropionitrile hydrochloride which comprises treating β-methyleneaminopropionitrile in an inert solvent with dry hydrogen chloride.

14. A process for converting β-aminopropionitrile sulfate to β-alanine comprising the steps of hydrolyzing said β-aminopropionitrile sulfate with barium hydroxide, thereafter neutralizing the resulting product and recovering said β-alanine.

15. The process of claim 14 in which said hydrolysis is carried out at a temperature of from about 90° to 100° C. for about 2 to 18 hours.

16. The process of claim 15 in which there is present from about 1.5 to 1.75 mols of barium hydroxide per mol of β-aminopropionitrile sulfate.

17. The process of claim 16 in which said barium hydroxide is barium hydroxide octahydrate.

18. The process of claim 13 in which the said reaction is carried out at a temperature of between about 50° to 75° C.

References Cited in the file of this patent

UNITED STATES PATENTS

| | | |
|---|---|---|
| 2,139,088 | Lewis | Dec. 6, 1938 |
| 2,783,267 | Lotz et al. | Feb. 26, 1957 |

OTHER REFERENCES

Whitmore: "Organic Chemistry," second edition, 1951, p. 166.

Wagner and Zook: "Synthetic Organic Chemistry," 1953, p. 728.